T. R. BUTMAN.
Furnace-Grate.

No. 198,487. Patented Dec. 25, 1877.

Witnesses
Fred G. Dieterich
D. T. Cowl

Inventor
Thomas Rud Butman

N. PETERS, PHOTO-LITHOGRAPHER, WASHINGTON, D C

UNITED STATES PATENT OFFICE.

THOMAS R. BUTMAN, OF MILAN, OHIO.

IMPROVEMENT IN FURNACE-GRATES.

Specification forming part of Letters Patent No. 198,487, dated December 25, 1877; application filed November 6, 1877.

*To all whom it may concern:*

Be it known that I, THOMAS REED BUTMAN, of Milan, in the county of Erie and State of Ohio, have invented certain new and useful Improvements in Furnace-Grate Bars; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to that class of grates known as "oscillating or rocking grates;" and has for its object the more general diffusion and equal distribution of air to the fuel upon the grate-surface; also, to diminish the quantity of iron or the material out of which the grate is made; also, to expose as small a surface of the solid material out of which the grate is made to the action of the heat as would be consistent with the kind of fuel used.

The invention consists—

First, in providing the upper surface of the grate with oblique cutting-edges and interlocking fingers, which also form parallel cutting-edges, and the portion between the oblique and parallel edges is rounded out, which performs the function of a cutter; but this rounded out part is more particularly designed to allow the interlocking fingers to extend nearly up to the cross-bar, so that when the grate is oscillated the interstices between the bars are so arranged that but little of the fuel can fall or pass between them while being oscillated.

Secondly, the cross-bar is corrugated in the direction of its length, and tapering from the top to the bottom, presenting a knife-edge surface toward the burning fuel; but said knife-edge is a considerable distance below said fuel, and the oblique edges project over this knife-edge, so that two of these projections form under and between them a V-shaped space, for the more ready distribution of the air and for the better preservation of the grate from the heat.

Thirdly, the fingers above described are of the shape of a half-circle in their cross-sections, and each series of fingers on a bar is nearly on a line with the corresponding series on the adjacent bar; or, in other words, the fingers on each cross-bar are staggered, so that a series of irregular orifices is presented, which allows a free and full supply of atmospheric air to the fuel. The further object of corrugating the cross-bar is that when the fingers oscillate they, being journaled to one side of their axis of motion, work up into these corrugations so close as to prevent the finer fuel from falling through or between them, and at the same time allow a free and sufficient supply of air around them and to the fuel. Each grate-bar has a pendent arm tapering from the top, either round or square, the front-end one being longer than the rest, and said pendent arms have holes in them for the reception of pins or split keys, the object being to secure the connecting-rod on the arms when all the bars are connected together, as will be seen at Fig. 5. The connecting-rod is provided with holes which correspond with the position of the pendent arms, and this connecting-rod is put in position by simply slipping it on the pendent arms and putting in the pins. The trunnions of the bars are put in the side journals or bearing-bars, which are cast with the frame, or may be screwed on or fastened in any approved manner.

My invention finally consists in providing a grate-bar with a series of upper projecting air-conduits, arranged to take the air from a point just under the surface of the grates, and emit said air in jets or sheets from horizontal slits in the upper ends of said projection, the air being thoroughly heated while passing through them. The air protects the projections themselves from the heat of the fire as it passes through them, and it passes out of the slits in sheets or jets.

Now, it will be seen that when the bars are oscillated the whole surface of the fuel is completely broken up and disintegrated, allowing a free and full access of air to the fuel, preventing the clogging or choking up of the interstices between the grates, and in a large degree the formation of clinkers, and with some kinds of fuel preventing their formation altogether by grinding them as they form.

It may be further observed that the slicingbar is entirely done away with and the fire is kept clear and bright without annoyance or waste.

Referring to the drawings, Figure 1 is a plan view of my improved grate, showing the oblique cutting-edges *a*, the interlocking fingers *b* alternating with the fingers of the adjacent section, the rounded cutting-edges *o*, which allow the parallel portion of the fingers *b* to approach the cross-bar without touching it, and a top view, *c*, of the knife-edge portion of the bar.

Fig. 2 represents an end elevation, in cross-section through the middle of each section of grate, showing the half-circular form of the bar or web, with one half the rib shown projecting out, while the other half is shown extending back. *c* is the knife-edge bar shown at Fig. 1, and *d* the V-shaped recess between the oblique edges. *e* is the pendent arm, and *f* the hole for the pin. *g* is the connecting-rod, and *h* the long front pendent arm, which is provided with a slot for reception of the bar which operates the oscillating bars.

Fig. 3 represents a side elevation of one of the bars, showing the curve of the web and finger and the whole upper surface of the grate to be greater than the under surface—that is, the parts diminish as they extend down, except the cross-bar, which enlarges downward, tapering in the opposite direction from the webs and the oblique cutting-edges, and extending some distance below them. By this means I provide for the expansion and contraction of the bars, and prevent their derangements. *i i* are the journals or trunnions of the grate-section.

Fig. 4 shows an inverted plan view of one of the grate-sections, illustrating the position of the pendent arm and the indentations or corrugations of the cross-bar. This figure also shows the thickness of the bottom of the cross-bar, which is principally designed to stiffen the bar when it is subjected to intense heat. It will be seen that the corrugated portion extends below the webs as a further means of strengthening them against the intense heat of the furnace.

Figure 1:
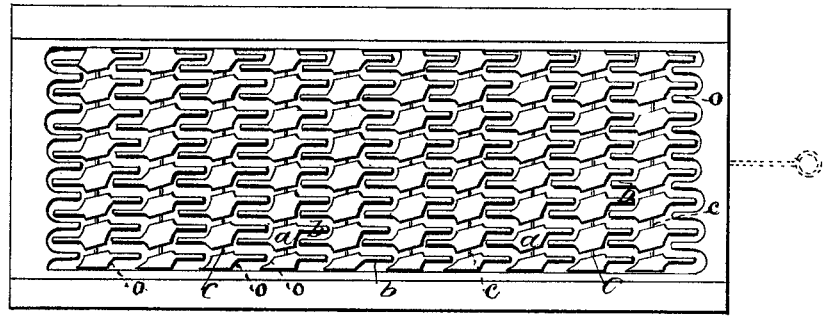
Figure 6:
Fig. 6 is a side elevation of the bearing-bar, provided with journal-bearings, in which the bars work, and these bearings are open on top, so that the bar can be readily inserted and removed when required.
Figure 2:
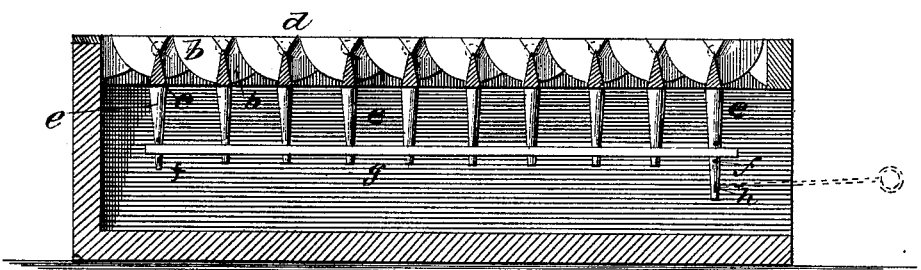
Figures 3, 4:
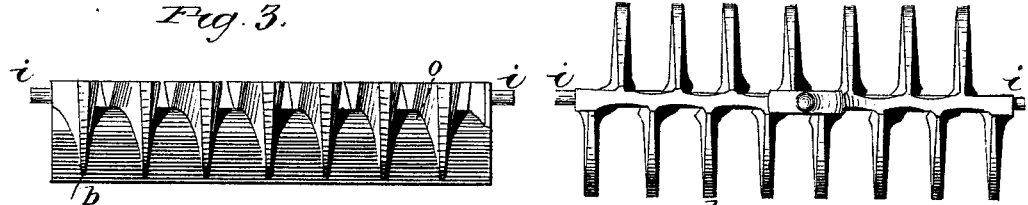
Figure 5:
Fig. 5 is a plan view of the connecting-rod which connects the grate-bars together, and by which they are oscillated and rocked.
Figure 7:
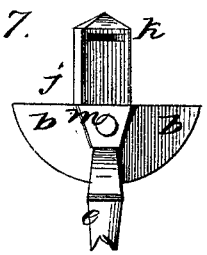

Fig. 7 shows an end view of one of the upwardly-projecting conduits or tuyeres, with its opening for the emission of air to the fuel. It will be seen that this projection is set obliquely, so that when it is rocked the corner forms a cutting-edge, thereby slicing the fuel. The grate-bar upon which this is cast is essentially the same as the other bars, and its function and operation have been already fully set forth. In this figure, *j* is the upward projection, and *k* the air-aperture. Three or four of such grate-bars are generally sufficient for a grate composed of about ten bars, as have been described. It will be seen that a shoulder, *m*, is provided upon the end of the bar, against which the bar works, and by which the suspended web is freed from rubbing against the side of the frame.

Thus it will be observed that a maximum of aid-admitting space is presented with a minimum of material in the grate-bar consistent with its effectiveness to withstand the intense heat of the furnace, and a thorough breaking up and disintegration of the fuel upon the grate-surface, as I have satisfactorily tested. Projecting fingers are provided on the end pieces, to correspond with the fingers upon the grate.

Having now fully described my invention, and the mode of construction and operation of the same, what I claim as new, and desire to secure by Letters Patent, is—

1. The grate-bar provided with the oblique cutting-edges and the knife-edge on the cross-bar, in the manner above set forth.

2. The grate-bar provided with fingers adapted to interlock with the fingers of the adjacent bar, as described, said fingers being provided with oblique cutting-edges, in the manner and for the purpose set forth.

3. In a grate-bar, the combination, with fingers provided with oblique cutting-edges, and with webs tapering downward, of the knife-shaped corrugated cross-bar extending below the web, in the manner shown and described.

4. The combination, substantially as described, of the fingered bars, their tapering pendent arms, and the connecting-rod, secured by pins or keys thereto, constructed to operate the fingered bars simultaneously, whereby the fuel on the grate is disintegrated, in the manner and for the purpose set forth.

5. The combination of the bar, fingered as described, and provided with the pendent arm, with the connecting-rod, and the side-journaled bearing-bar, as shown, and for the purposes ser forth.

6. The combination of the finger-bar, the cross-bar, and the upper projecting conduit or tuyere, arranged to supply air to the fuel, in the manner and for the purpose herein described.

In testimony that I claim the foregoing as my own I affix my signature in presence of two witnesses.

THOMAS REED BUTMAN.

Witnesses:
H. E. THOMAS,
GEO. B. EWING.